(12) United States Patent
Vanmoor

(10) Patent No.: US 6,899,525 B2
(45) Date of Patent: May 31, 2005

(54) BLADE AND WING CONFIGURATION

(76) Inventor: Arthur Vanmoor, 5B3 500313935 P.O. Box 9356, Fort Lauderdale, FL (US) 33310

( * ) Notice: Subject to any disclaimer, the term of this patent is extended or adjusted under 35 U.S.C. 154(b) by 0 days.

(21) Appl. No.: 10/692,635

(22) Filed: Oct. 24, 2003

(65) Prior Publication Data

US 2004/0091359 A1 May 13, 2004

Related U.S. Application Data

(63) Continuation-in-part of application No. 10/208,565, filed on Jul. 30, 2002, now Pat. No. 6,749,401.

(30) Foreign Application Priority Data

Jul. 22, 2002 (NL) .............................. 1021123

(51) Int. Cl.$^7$ ............................. F04D 29/38
(52) U.S. Cl. ................... 416/223 R; 416/243; 416/228
(58) Field of Search ........................... 416/223 R, 228, 416/243

(56) References Cited

U.S. PATENT DOCUMENTS

| | | | |
|---|---|---|---|
| 2,899,128 A | * | 8/1959 | Vaghi .......................... 415/222 |
| 4,431,376 A | * | 2/1984 | Lubenstein et al. ...... 416/223 A |
| 6,095,457 A | | 8/2000 | Vanmoor |
| 6,164,919 A | | 12/2000 | Vanmoor |
| 6,168,384 B1 | | 1/2001 | Vanmoor |

* cited by examiner

Primary Examiner—Ninh H. Nguyen
(74) Attorney, Agent, or Firm—Laurence A. Greenberg; Werner H. Stemer; Ralph E. Locher

(57) ABSTRACT

A blade or wing configuration has a leading edge and a trailing edge, and an upper surface and a lower surface extending from the leading edge to the trailing edge. At least one of the upper surface and the lower surface is formed with a curved segment and a straight segment. The curved segment starts from a starting point on the upper surface or the lower surface between the leading edge and the trailing edge and ends at the leading edge. The straight segment extends from the starting point to the trailing edge. A tangent at the leading edge is substantially parallel to the direction of movement and the straight segment forms an angle θ of approximately 30°–60° with respect to the direction of movement. The trailing edge can be formed with teeth.

7 Claims, 1 Drawing Sheet

BLADE AND WING CONFIGURATION

CROSS-REFERENCE TO RELATED APPLICATION

This application is a continuation-in-part of U.S. patent application Ser. No. 10/208,565, filed Jul. 30, 2002 now U.S. Pat. No. 6,749,401.

BACKGROUND OF THE INVENTION

Field of the Invention

The invention lies in the field of fluid dynamics. In particular, the invention pertains to a dynamically optimized configuration for blades of watercraft propulsion propellers, stationary fluid propellers, aircraft propellers, and aircraft wings.

In a series of earlier patents, including U.S. Pat. Nos. 6,164,919; 6,168,384; and 6,095,457, the inventor of the present application presented a novel concept for propeller blade configurations and airfoil and wing configurations. The concept provided for the surfaces of propeller blades and the like, which had previously been rounded along a slight curve in one direction, to be shaped along a tangent or a sine function. That is, a cross-section of the propeller blade at any line substantially perpendicular to a longitudinal axis of the configuration would show a double-curved shape which can be best described with a sine function and/or a tangent function. The earlier disclosures of U.S. Pat. Nos. 6,164,919; 6,168,384; and 6,095,457 are hereby incorporated by reference.

SUMMARY OF THE INVENTION

While those earlier patents provide considerable advantages in a variety of speed ranges, the present invention proposes another novel configuration for propeller blades and the like and also provides a novel structure at the trailing edge of the blades or wings.

With the foregoing and other objects in view there is provided, in accordance with the invention, a blade or wing configuration, comprising:
a leading edge with respect to a direction of movement of the blade or wing;
a trailing edge; and
an upper surface and a lower surface extending from the leading edge to the trailing edge, at least one of the upper surface and the lower surface being formed with a curved segment and a straight segment, the curved segment starting from a starting point on the at least one of the upper surface and the lower surface between the leading edge and the trailing edge and ending at the leading edge, the straight segment extending from the starting point to the trailing edge in a tangent direction at the starting point, a tangent at the leading edge being substantially parallel to the direction of movement, and the straight segment forming an angle θ of approximately 30°–60° with respect to the direction of movement.

In accordance with an added feature of the invention, the starting point is located substantially equidistantly between the leading edge and the trailing edge.

In accordance with an additional feature of the invention, the angle θ is preferably approximately 45°.

In accordance with a further feature of the invention, a tangent angle at each point of the curved segment, with respect to the direction of movement, changes from approximately 30°–60° at the starting point to 0° at the leading edge gradually and continuously.

In accordance with again an added feature of the invention, the trailing edge is formed with teeth.

In accordance with again an additional feature of the invention, the teeth have a depth of up to one half of a length of the straight segment.

In accordance with again another feature of the invention, the teeth have a triangular, conical, or trapezoidal cross-sectional shape and the like.

The term propeller, herein, refers to propulsion propellers and impellers, such as for water propellers and for aircraft propellers (propulsion props, turbine blades, helicopter blades), as well as to stationary propellers and impellers used in high-power fans (wind tunnels, high velocity fluid pumps) and stationary turbines.

The term wing pertains to fixed wings and airfoils for fixed wing aircraft as well as gliders and glider wings for helicopters and the like.

Other features which are considered as characteristic for the invention are set forth in the appended claims.

Although the invention is illustrated and described herein as embodied in an airfoil configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
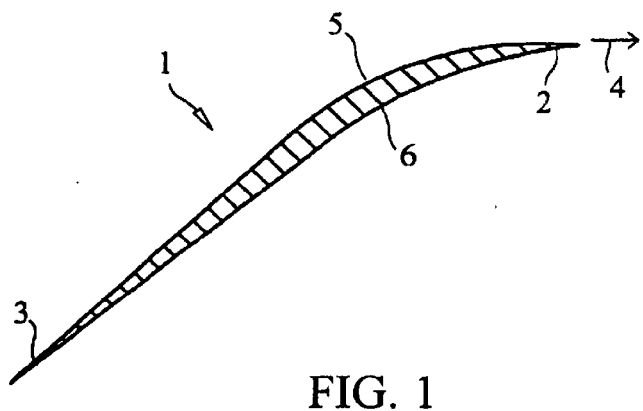
FIG. 1 shows a cross-section taken through an airfoil structure according to the invention.

Referring now to the figures of the drawing in detail and first, particularly, to FIG. 1 thereof, there is seen a cross-section taken through a blade or wing configuration according to the invention. The blade or wing 1 has a leading edge 2 and a trailing edge 3 with respect to a moving direction 4 of the blade or wing, and an upper surface 5 and a lower surface 6 extending from the leading edge 2 to the trailing edge 3. The upper surface 5 and the lower surface 6 have substantially the same curvature, but offset and merge at the leading edge 2 and the trailing edge 3.

Figure 2:
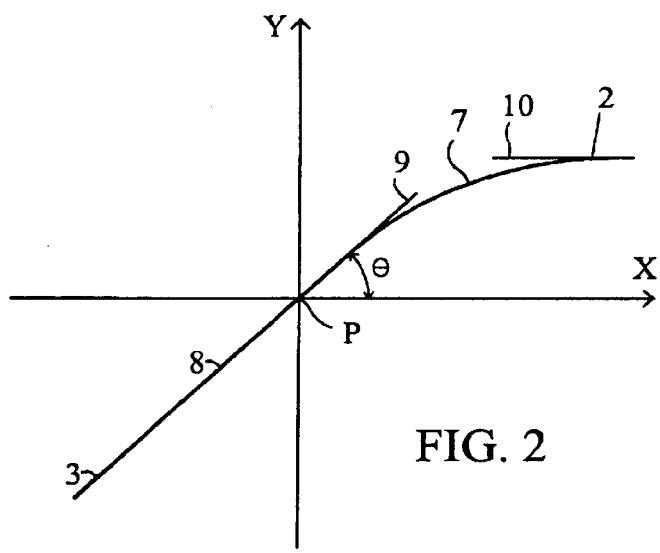
FIG. 2 uses a Cartesian plane to show the curvature of the surface of the airfoil.

Referring now specifically to FIG. 2 in which the curvature of the upper surface 5 is depicted in a Cartesian plane. The moving direction 4 of the blade or wing 1 is parallel to the X-axis of the Cartesian plane. As shown in FIG. 2, the upper surface 5 has a curved segment 7 and a substantially straight segment 8. The curved segment 7 starts from a starting point P having a tangent 9 forming an angle θ with respect to the X-axis of the Cartesian plane in the range of about 30°–60°, preferably 45°, and ends at the leading edge 2 having a tangent 10, which is substantially parallel to the X-axis of the Cartesian plane. In other words, the tangent 10 at the leading edge 2 forms an angle θ of approximate 0° with respect to the X-axis of the Cartesian plane. The angle θ changes from 30°–60° at the starting point P to about 0° at the leading edge 2 gradually and continuously. The straight segment 8 extends substantially straight from the starting point P until the trailing edge 3 in a direction coinciding with the tangent 9 at the starting point P. The length of the straight segment 8 and the length of the curved segment 7 can be chosen according to different air condition, but are preferably to be approximately the same.

Figure 3A:
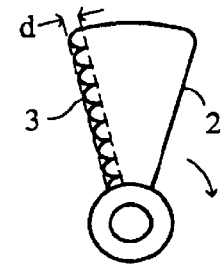
FIG. 3A is a diagrammatic plan view of a propeller blade with a tooth-shaped trailing edge, in which the leading and trailing edges are straight.
Figure 4A:
FIGS. 4A–4C diagrammatically show some examples of different shapes of the tooth-shaped trailing edge.
Figure 4B:
Figure 4C:
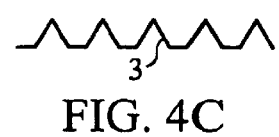

As shown in FIG. 3A, the trailing edge 3 of the blade or wing 1 is formed with teeth in order to reduce the vortex in the area. By using tooth-shaped trailing edge, only small eddy currents will be formed and large eddy drag can be effectively eliminated. The teeth can be formed with a depth d of up to one half of the length of the straight segment 7. The teeth can be of a variety of different cross-sectional shapes, for example, triangle (FIG. 4A), cone (FIG. 4B), and trapezoid (FIG. 4C), etc.

Figure 3B:
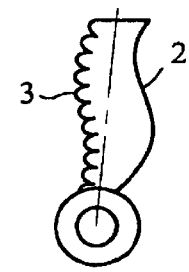
FIG. 3B is a diagrammatic plan view of a propeller blade with a tooth-shaped trailing edge, in which the leading and trailing edges are curved.

In FIG. 3A, the leading and trailing edges are substantially straight. The tooth-shaped trailing edge can also be applied to an airfoil with curved leading and trailing edges as shown in FIG. 3B (the curved leading edge structure is described in the pending U.S. patent application Ser. No. 10/208,565 of the inventor of the present invention, which is hereby incorporated by reference).

I claim:

1. A blade or wing configuration, comprising:
    a leading edge with respect to a direction of movement of the blade or wing;
    a trailing edge; and
    an upper surface and a lower surface extending from said leading edge to said trailing edge, at least one of said upper surface and said lower surface being formed with a curved segment and a straight segment, said curved segment starting from a starting point on said at least one of said upper surface and said lower surface between said leading edge and said trailing edge and ending at said leading edge, said straight segment extending from said starting point to said trailing edge in a tangent direction at said starting point, a tangent at said leading edge being substantially parallel to said direction of movement, and said straight segment forming an angle θ of approximately 30°–60° with respect to said direction of movement.

2. The blade or wing configuration according to claim 1, wherein said starting point is located substantially equidistantly between said leading edge and said trailing edge.

3. The blade or wing configuration according to claim 2, wherein said angle θ is approximately 45°.

4. The blade or wing configuration according to claim 1, wherein a tangent angle at each point of said curved segment, with respect to said direction of movement, changes from approximately 30°–60° at said starting point to 0° at said leading edge gradually and continuously.

5. The blade or wing configuration according to claim 1, wherein said trailing edge is formed with teeth.

6. The blade or wing configuration according to claim 5, wherein said teeth have a depth of up to one half of a length of said straight segment.

7. The blade or wing configuration according to claim 5, wherein said teeth have a cross-sectional shape selected from a group consisting of triangular, conical, and trapezoidal shapes.

* * * * *